United States Patent [19]

Sano et al.

[11] Patent Number: 4,881,748
[45] Date of Patent: Nov. 21, 1989

[54] STEERING SYSTEM FOR FRONT AND REAR WHEELS OF AUTOMOTIVE VEHICLE

[75] Inventors: Shoichi Sano; Yoshimi Furukawa; Masami Ogura; Masaru Abe; Yasuharu Oyama, all of Saitama, Japan

[73] Assignee: Honda Giken Kogyo Kabushiki Kaisha, Tokyo, Japan

[21] Appl. No.: 191,543

[22] Filed: May 9, 1988

Related U.S. Application Data

[60] Division of Ser. No. 35,646, Apr. 7, 1987, Pat. No. 4,772,036, and a continuation-in-part of Ser. No. 822,008, Jan. 24, 1986, Pat. No. 4,703,946.

[30] Foreign Application Priority Data

Apr. 7, 1986 [JP] Japan ............................. 61-79567
Sep. 9, 1986 [JP] Japan ............................. 61-211929
Sep. 9, 1986 [JP] Japan ............................. 61-211930

[51] Int. Cl.⁴ ............................................. B62D 5/06
[52] U.S. Cl. ................................... 280/91; 180/140; 74/44; 74/50
[58] Field of Search ................. 280/91, 99; 74/25, 44, 74/50; 180/140

[56] References Cited

U.S. PATENT DOCUMENTS

| 3,374,057 | 3/1968 | Jesse | 74/50 |
| 4,313,514 | 2/1982 | Furukawa et al. | 180/143 |
| 4,610,455 | 9/1986 | Furukawa et al. | 280/91 |
| 4,647,067 | 3/1987 | Furukawa et al. | 280/91 |
| 4,703,945 | 11/1987 | Kawamoto et al. | 280/91 |
| 4,768,603 | 9/1988 | Sugiyama et al. | 280/91 |

FOREIGN PATENT DOCUMENTS

59-26363 2/1984 Japan .
59-26364 2/1984 Japan .
59-26365 2/1984 Japan .

*Primary Examiner*—Kenneth R. Rice
*Attorney, Agent, or Firm*—Irving M. Weiner; Joseph P. Carrier; Pamela S. Burst

[57] ABSTRACT

A steering system for the front and rear wheels of an automotive vehicle comprises a front wheel steering mechanism having an output shaft, a rear wheel steering mechanism having an input shaft coupled to the output shaft, an output member for steering the rear wheels, and a motion converting mechanism for converting rotation of the input shaft to movement of the output member, a vehicle speed sensor, and a control unit connected to the vehicle speed sensor for controlling operation of the motion converting mechanism dependent on the vehicle speed detected by the vehicle speed sensor. The motion converting mechanism comprises a shaft angularly movable by the input shaft, the shaft having an arm extending radially from one end thereof, a guide mounted on the output member and extending in a vertical direction transverse to an axis of the output member, a slide assembly disposed between and interconnecting the arm and the guide, and a drive device controlled by the control unit for moving the slide assembly along the guide. The drive device includes a gear mechanism connected with said slide assembly and a pair of motors coupled to the gear mechanism for driving the same, the pair of motors being driven in association with each other.

3 Claims, 6 Drawing Sheets

STEERING SYSTEM FOR FRONT AND REAR WHEELS OF AUTOMOTIVE VEHICLE

This application is a divisional application of USSN 035,646 filed Apr. 7, 1987, now U.S. Pat. No. 4,772,036, and is also a continuation-in-part (CIP) application of USSN 822,008 filed Jan. 24, 1986, now U.S. Pat. 4,703,945.

BACKGROUND OF THE INVENTION

1. Field of the Invention:

The present invention relates to a steering system for simultaneously steering the front and rear wheels of an automotive vehicle.

2. Description of the Relevant Art:

There are known steering systems for steering the rear wheels of an automotive vehicle simultaneously with the front wheels thereof (also referred to as a "4WS system"), as disclosed in Japanese Patent Publication No. 60-44185, for example. When the automotive vehicle is steered while it is traveling at a high speed, the rear wheels are steered in the same direction as the steering direction of the front wheels, and hence the steering response is increased. When the vehicle is steered at a low vehicle speed, the rear and front wheels are steered in opposite direction, thus reducing the radius of turning movement of the vehicle, thereby to improve the vehicle maneuvering ability.

The 4WS system with the steering angle ratio between the front and rear wheels being variable as a function of the vehicle speed can roughly be divided into two categories. In one category, front and rear wheel steering mechanisms are driven by independent drive sources such as electric motors or hydraulic actuators and the rear wheels are steered by the rear wheel steering mechanism based on a front wheel steering angle and vehicle speed information (see Japanese Laid-Open Patent Publications Nos. 59-81264 and 59-81274, for example). In the other category, front and rear wheel steering mechanisms are mechanically interconnected and an additional drive device for adjusting the rear wheel steering angle dependent on the vehicle speed is associated with the rear wheel steering mechanism (see U.S. Pat. No. 4,610,455 and Japanese Laid-Open Patent Publications Nos. 59-26363 and 59-26364, for example).

The 4WS system in the former group requires the independent drive source for steering the rear wheels and hence is of an increased weight and takes up an increased space in the automotive vehicle. In addition, this type of 4WS system fails to provide a good response since the steering angles of the front and rear wheels and the vehicle speed must be detected from time to time and the steering angle ratio and the vehicle speed must be compared.

According to the 4WS system of the latter design, inasmuch as the front and rear wheel steering mechanisms are mechanically coupled to each other, an increase in the steering force that is required to steer the rear wheels together with the front wheels can be produced simply by increasing the capability of the power assisting device in the front wheel steering mechanism. Therefore, the 4WS system of this type is lighter and occupies a smaller space than the 4WS system of the former type does. Another advantage is that the steering response is quick because the rear steering angle responsive to the front steering angle is adjusted dependent on the vehicle speed. However, one problem of the conventional 4WS systems in the latter category is the requirement of a relatively large driving force for the rear wheel driving mechanism since the rear wheel steering angle is adjusted by vertically moving the output member of the rear wheel driving mechanism.

SUMMARY OF THE INVENTION

According to the present invention, there is provided a steering system for the front and rear wheels of an automotive vehicle, comprising a front wheel steering mechanism, the front wheel steering mechanism having an output shaft, a rear wheel steering mechanism, the rear wheel steering mechanism having an input shaft coupled to the output shaft, an output member for steering the rear wheels, and a motion converting mechanism for converting rotation of the input shaft to movement of the output member, a vehicle speed sensor, a control unit connected to the vehicle speed sensor for controlling operation of the motion converting mechanism dependent on the vehicle speed detected by the vehicle speed sensor. The motion converting mechanism comprises a shaft angularly movable by the input shaft, the shaft having an arm extending radially from one end thereof, a guide mounted on the output member and extending in a vertical direction transverse to an axis of the output member, slide means disposed between and interconnecting the arm and the guide, and drive means for moving the slide means along the guide, the drive means being controlled in operation by the control unit.

When the slide means is moved by the drive device for an interval dependent on the vehicle speed in a direction transverse to the output member, the position of the center of the slide means with respect to the axis of a main shaft is displaced for an interval dependent on the vehicle speed, and an arm integral with the main shaft serves as a crank arm. Rotation of the crank arm is converted via the slide means to lateral movement of the output member integral with the guide for controlling the steering angle ratio of the rear wheels to the front wheels according to the vehicle speed.

The drive force required to adjust the steering angle of the rear wheels is small since only the slide means is moved vertically without vertically moving the output member itself.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
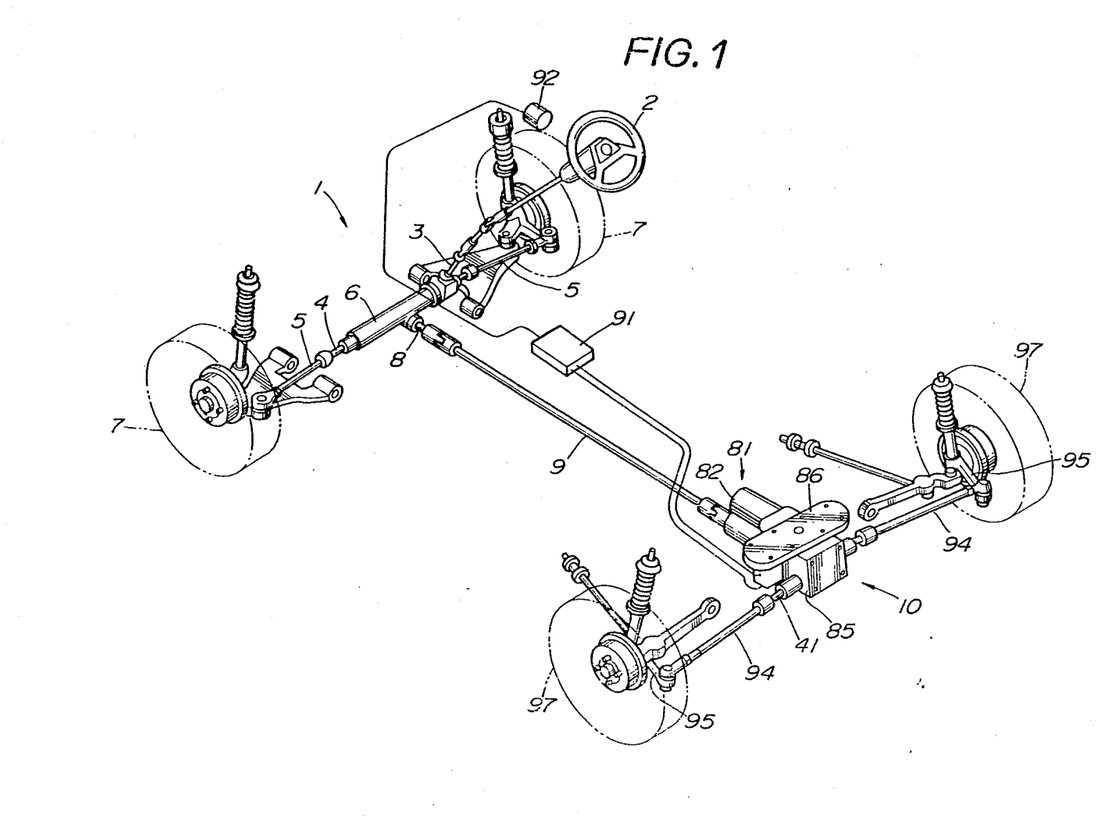
FIG. 1 is a perspective veiw of a steering system for steering front and rear wheels according to a first embodiment of the present invention.

As shown in FIG. 1, a steering system according to a first embodiment of the present invention, which is incorporated in a motor vehicle such as an automobile, generally includes a front wheel steering mechanism 1, a rear wheel steering mechanism 10, an electronic control unit (ECU) 91, and a vehicle speed sensor 92.

The front wheel steering mechanism 1 essentially comprises a steering wheel 2, an input pinion shaft 3, a rack shaft 4, and a pair of tie rods 5. The rack shaft 4 is movably disposed in a front wheel steering gear box 6. The tie rods 5 are operatively coupled respectively to a pair of front wheels 7. The front wheel steering gear box 6 also houses an output pinion shaft 8 meshing with the rack shaft 4 and projecting rearwardly.

The output pinion shaft 8 serves to transmit rotation for steering rear wheels through about ∓270°. The output pinion shaft 8 is coupled through a joint to a linkage shaft 9 which is in turn coupled by a joint to an input shaft 11 (FIG. 2) of the rear wheel steering mechanism 10.

Figure 2:
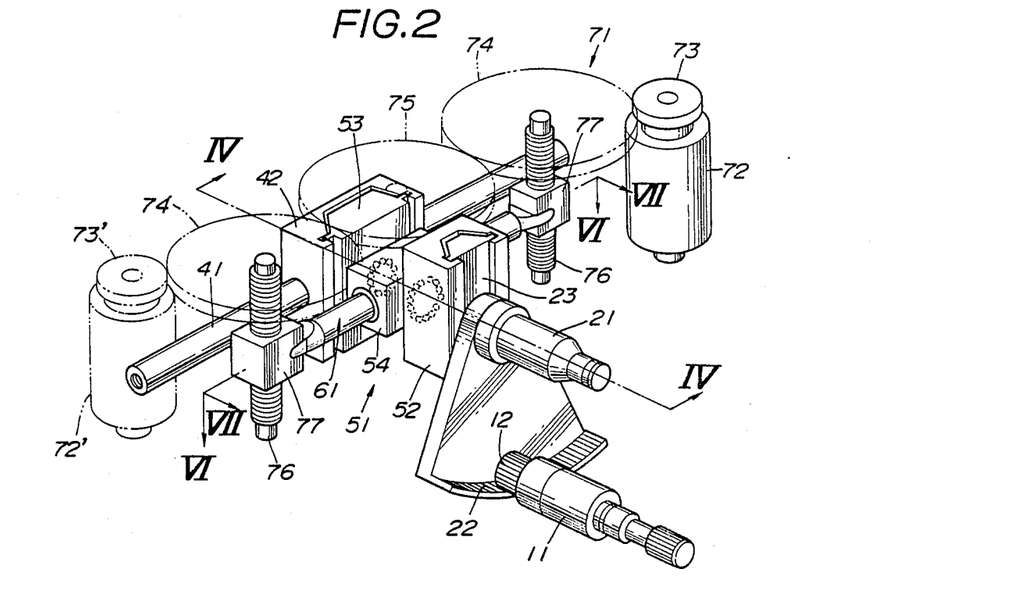
FIG. 2 is a fragmentary perspective view of a rear wheel steering mechanism of the steering system shown in FIG. 1.

As illustrated in FIG. 2, the rear wheel steering mechanism 10 comprises the input shaft 11, a main shaft 21, an output member 41, a slide assembly 51, and a drive device 71. As shown in FIG. 1, the rear wheel steering mechanism 10 also includes a pair of tie rods 94 operatively coupled to a pair of rear wheels 97, respectively, through corresponding knuckle arms 95. The rear wheel steering mechanism 10 also has a rear wheel steering gear box 81 housing various components shown in FIG. 2.

In FIG. 2, the rear end of the input shaft 11 has a pinion 12, and the main shaft 21 is disposed immediately above the input shaft 11 parallel thereto. The rear end of the main shaft 21 is integrally formed with a sector-shaped internal gear 22 extending downwardly and held in mesh with the pinion 12 at its lower teeth. An arm 23 is integral with the rear surface of the internal gear 22 and extends diametrically across the main shaft 21. The internal gear 22 and the arm 23 are maintained in a vertical position when the rear wheels 97 are in a neutral steering position.

Since the internal gear 22 meshing with the pinion 12 at its lower teeth is disposed on the main shaft 21 for transmitting rotation from the input shaft 11 to the main shaft 21 with a large reduction in the rotational speed, any influence of a lost motion or play and torsional rigidity which are caused in the path of transmission of rotation from the front wheel steering mechanism 1 can be reduced to a large extent. The internal gear 22 serves to reduce the inter-axis distance between the input shaft 11 and the main shaft 21, with the results that the speed reducer composed of the input shaft 11, the internal gear 22, and the main shaft 21 is small in size, and the overall size of the rear wheel steering mechanism 10 is reduced.

Figure 4:
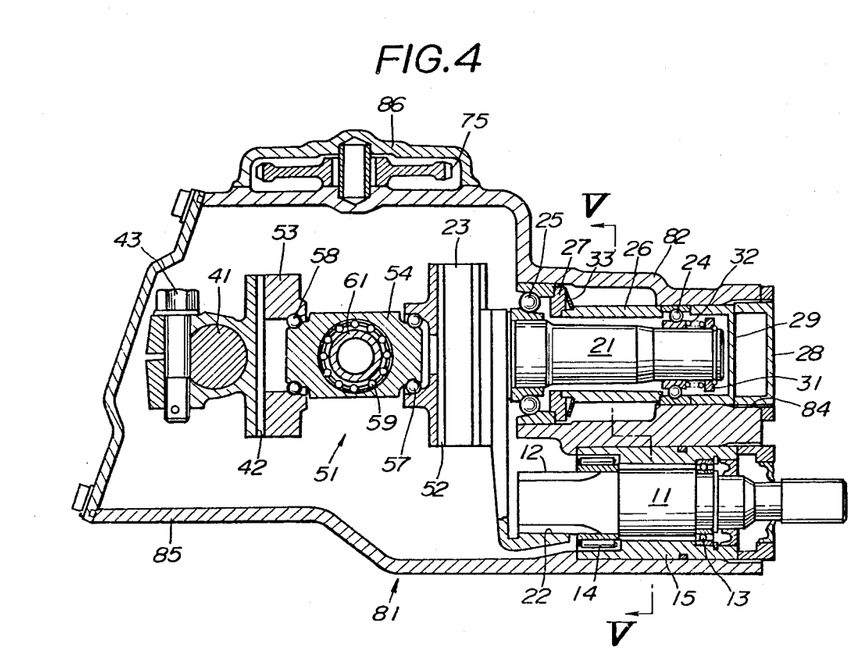
FIG. 4 is a cross-sectional view taken along line IV—IV of FIG. 2.
Figure 5:
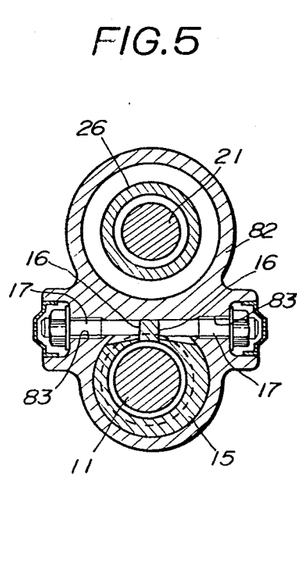
FIG. 5 is a cross-sectional view taken along line V—V of FIG. 4.

As shown in FIG. 4, the input shaft 11 is rotatably housed in a sleeve 15 by means of a front ball bearing 13 and a rear needle bearing 14. The input shaft 11 is eccentrically supported in the sleeve 15 (FIG. 5). The sleeve 15 is rotatably disposed in a front portion 82 of the rear wheel steering gear box 81, and has a pair of laterally opposite recesses or steps 16. The front portion 82 of the rear wheel steering gear box 81 has a pair of laterally opposite screw holes 83 opening laterally toward the steps 16, respectively. A pair of adjustment screws 17 is threaded respectively through the screw holes 83, with the tips thereof abutting against the steps 16, respectively. By threading in one of the adjustment screws 17, it pushes the corresponding step 16 to turn the sleeve 15 about its own axis for thereby removing a lost motion or play between the pinion 12 and the internal gear 22, which are therefore brought into smooth mesh with each other.

The main shaft 21 is rotatably accommodated in the front gear box portion 82 by means of front and rear ball bearings 24, 25. Between the outer races of the bearings 24, 25, there are located a collar 26 and a flange 27 disposed at the rear end of the collar 26. The inner race of the front bearing 24, the outer race thereof, and the outer race of the rear bearing 25 are axially movably fitted in the front gear box portion 82. The front gear box portion 82 has a screw hole 84 defined in its front wall concentrically with the main shaft 21 and opening in front of the main shaft 21. An adjustment screw 28 is threaded in the screw hole 84, with a cap 29 interposed between the adjustment screw 28 and the outer race of the front bearing 24. A coil spring 32 is placed under compression between a retainer 31 secured to the front end of the main shaft 21 and the inner race of the front bearing 24. A Belleville spring 33 is disposed under compression between the collar 26 and the flange 27.

Figure 6:
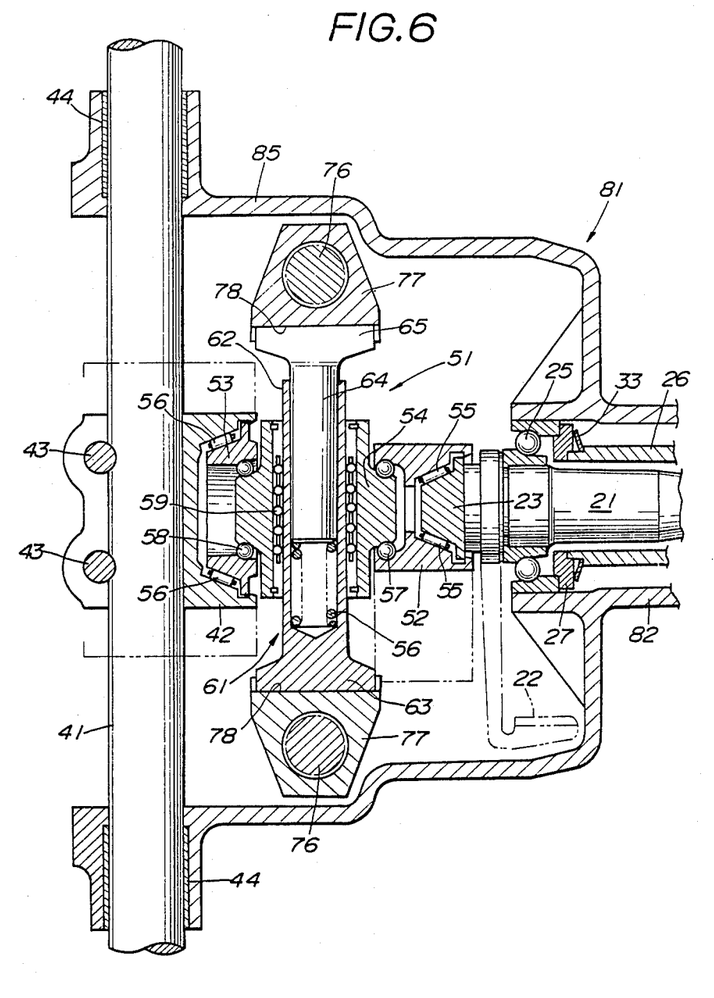
FIGS. 6 and 7 are cross-sectional views taken along lines VI—VI and VII—VII, respectively, of FIG. 2.

The output member 41 is disposed behind the arm 23 in spaced relation thereto. As shown in FIG. 6, the output member 41 is in the form of a shaft extending laterally horizontally. A vertical guide 42 is fixed to the central portion of the output member 41 by means of bolts 43. The output member 41 is laterally movably supported in a rear portion 85 of the rear wheel steering gear box 81 by means of journal bearings 44. The slide assembly 51 is interposed between the guide 42 and the arm 23.

The slide assembly 51 comprises a first slide piece 52 fitted over the arm 23 at its rear portion through tapered surfaces and slidable diametrically across the main shaft 21, a second slide piece 53 fitted in the guide 42 at its front portion through tapered surfaces and slidable in the vertical direction, a central piece 54 disposed between the slide pieces 52, 53 and fitted therein for relative rotation with respect thereto, and a lateral support shaft 61 by which the central piece 54 is vertically movably supported.

Laterally spaced needle bearings 55 are disposed between the tapered surfaces of the first slide piece 52 and the arm 23, and similarly, laterally spaced needle bearings 56 are disposed between the tapered surfaces of the second slide piece 53 and the guide 42. A ball bearing 57 is interposed between the interfitting surfaces of the first slide piece 52 and the front portion of the central piece 54, and similarly, a ball bearing 58 is interposed between the interfitting surfaces of the second slide piece 53 and the central piece 54. The central piece 54 is mounted on the support shaft 61 by means of a slide bearing 59.

When the adjustment screw 28 (FIG. 4) is threaded into the front gear box portion 82 in order to remove a lost motion or play in the path of transmission extending from the main shaft 21 via the slide assembly 51 to the output member 41, the main shaft 21 is moved rearwardly through the cap 29, the bearing 24, the collar 26, the flange 27, and the bearing 25. More specifically, a lost motion or play in the bearing 25 can be removed, and also a lost motion or play in the needle bearings 55 between the arm 23 and the first slide piece 52 can be eliminated. As the first slide piece 52 is moved back, a lost motion or play in the ball bearing 57 between the first slide piece 52 and the central piece 54 can be removed. The support shaft 61 supporting the central piece 54 is movably disposed between nut members 77. As the support shaft 61 is moved back between the nut members 77, the central piece 54 is also moved rearwardly to eliminate a lost motion or play in the ball bearing 58 between the central piece 54 and the second slide piece 53, and also to remove a lost motion or play in the needle bearings 56 between the second slide piece 53 and the guide 42. A lost motion or play between the output member 41 and the journal bearings 44 can also be eliminated.

Therefore, all of lost motions or plays can be removed from the bearings 55, 57, 58, 56 and from between the output member 41 and the journal bearings 44. The lost motions or plays can smoothly be eliminated since the ball bearings 25, 57, 58 are of the angular contact type and the needle bearings 55, 56 are of the wedge type.

The Belleville spring 33 is preloaded between the collar 26 and the flange 27. Any undesired lost motion or play is removed in the above manner while the spring 33 is being preloaded and the components are held in place by tightening the adjustment screw 28. Therefore, even if a lost motion or play is subsequently produced due to wear during usage, the main shaft 21 can be moved back under the resiliency of the spring 33 for automatically removing such a lost motion insofar as the lost motion is of such a extent that falls in the preloaded range of the spring 33. Any lost motion or play can be removed from the bearing 24 by the coil spring 32.

A lost motion or play cannot be removed from between the slide bearing 59, the central piece 54, and the support shaft 61. However, these members are less subject to wear inasmuch as the force applied from the main shaft 21 to move the output member 41 laterally is not directly imposed on these members. Any lost motion or play produced between these members will not cause a substantial problem as it has no adverse effect on the function of the rear wheel steering mechanism.

As described above, any undesired lost motion or play can easily be removed from the various many components positioned between the main shaft 21 and the output member 41 simply by turning the single adjustment screw 28 without the need for strict dimesional requirements with respect to these components themselves and their relative positions. Wear on these components is minimized by the use of the various bearings.

The support shaft 61 comprises a sleeve shaft member 62 and a rod shaft member 64 slidably disposed in the sleeve shaft member 62, with a coil spring 66 interposed under compression therebetween. The sleeve and rod shaft members 62, 64 have outer ends serving as engaging projections 63, 65, respectively, which are widened in the transverse direction thereof and have an arcuate cross section, as shown in FIG. 7.

The drive device 71 serves to move the support shaft 61 upwardly and downwardly.

Figure 7:
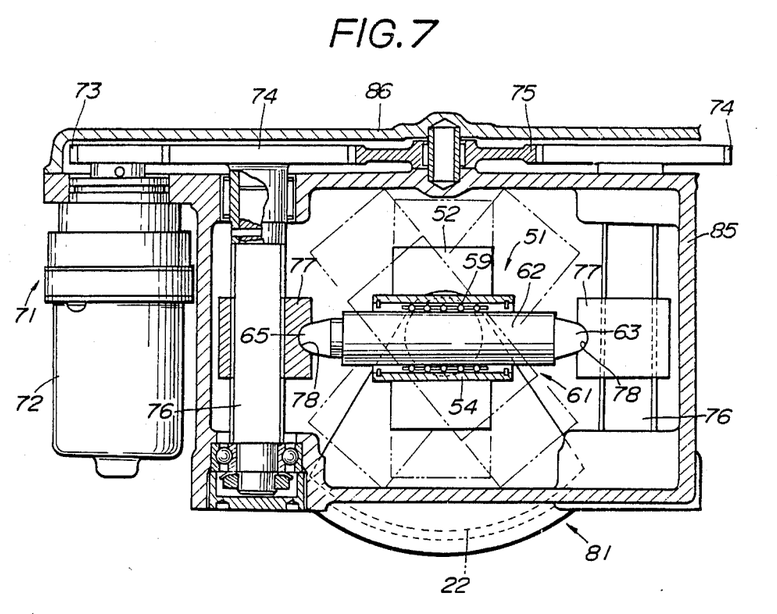
Figure 8:
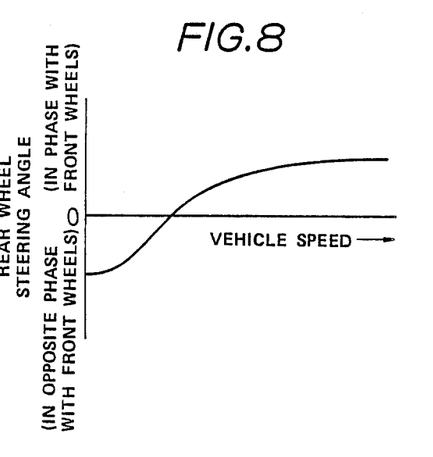
FIG. 8 is a graph showing the rear wheel steering angle as it varies as a function of the vehicle speed.

As illustrated in FIG. 7, the drive device 71 comprises a motor 72 with an encoder for monitoring the rotational speed and angle thereof, a train of four gears 73, 74, 74, 75, a pair of laterally spaced vertical feed screws 76, and the pair of nuts 77 movably threaded over the feed screws 76. The motor 72 is fixed to one side of the rear gear box portion 85, and the drive gear 73 is secured to the upper end of the output shaft of the motor 72. The feed screws 76 are rotatably disposed in the rear gear box portion 85 and located one on each side of the slide assembly 51. The feed screws 76 have upper ends to which the driven gears 74 are secured, respectively. The intermediate gear 75 is positioned between the driven gears 74. The gears 73, 74, 74, 75 are located above the rear gear box portion 85 and covered with a gear cover 86. The nuts 77 threaded respectively over the feed screws 76 have inner ends having recesses 78, respectively, of arcuate cross section. The engaging projections 63, 65 of the support shaft 61 engage respectively in the recesses 78.

The sleeve and rod shaft members 62, 64 of the support shaft 61 are resiliently biased to move in a direction apart from each other under the resiliency of the coil spring 66, so that the nuts 77 are urged to move in a direction apart from each other. Thus, any lost motion or play between the nuts 77 and the feed screws 76 is automatically absorbed or removed, and so are dimensional errors of the feed screws 76. As a result, the support shaft 61 is kept properly supported between the nuts 77 threaded on the feed screws 76, respectively, at all times.

Since the engaging projections 63, 65 at the outer ends of the support shaft 61 are fitted respectively in the recesses 78 of the nuts 77, the support shaft 61 is allowed to be tilted. Therefore, even if the nuts 77 are positioned at different heights due to phase errors and plays between the gears 73, 74, 75 and phase errors between the feed screws 76 and the nuts 77, the support shaft 61 is tilted to prevent any resistance to vertical movement of the support shaft 61 from being increased. Consequently, the support shaft 61 can easily be moved vertically for smooth vertical movement of the central piece 54.

The nuts 77 are smoothly vertically moved through speed reduction upon rotation of the feed screws 76. However, the feed screws 76 are not rotated by a vertical load applied to the nuts 77. Thus, when a reactive force acts to move the central piece 54 vertically, such a reactive force is borne by the nuts 77 as the support shaft 61 is supported at its opposite ends on the nuts 77, and is not transmitted to the gears 73, 74, 75 and the motor 72.

The motor 72 may be of a small capacity for a smaller weight because any physical load on the motor 72 and the gears 73, 74, 75 is small.

As indicated by the imaginary lines in FIG. 2, another motor 72' which is driven in association with the motor 72 may be operatively coupled to the other end of the train of gears 73, 74, 74, 75. Even when one the motors 72, 72' fails, the system function remains normal if the other motor operates properly.

Figure 3:
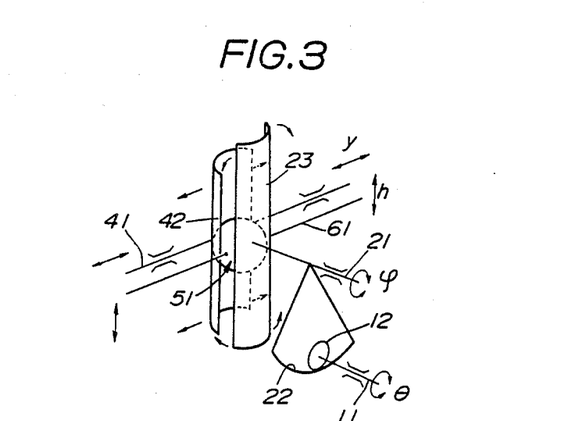
FIG. 3 is a schematic view showing the basic principle of the rear wheel steering mechanism of FIG. 2.

FIG. 3 shows the basic principle of operation of the rear wheel steering mechanism 10, where the slide assembly 51 is illustrated as a single spherical body.

Information as to the rotational speed and angle of the motor 72 is applied by the encoder to the ECU 91 in which the information is compared with vehicle speed information from the vehicle speed sensor 92 to determine an optimum steering angle ratio between the front and rear wheels 7, 97, and in which operation of the motor 72 is confirmed at all times.

The vehicle speed information may be obtained from a speedometer, or may be produced from pulses generated by a wheel or from a radar. In the latter case, the response of the steering system is higher. Although the steering ratio between the front and rear wheels is determined by monitoring the motor 72 with the encoder associated therewith, movement of one of the components of the rear wheel steering mechanism 10, such as one of the nuts 77, may directly be monitored by a differential transformer, a rheostat, or an optical device for a higher system response.

Operation of the steering system will be described below. Since operation of the front wheel steering mechanism 1 is known in the art, only operation of the rear wheel steering mechanism 10 will be described below.

When rotation of the front wheel steering mechanism 1 is applied to the input shaft 11, such rotation is transmitted from the input shaft 11 to the main shaft 21 while the speed of applied rotation is being reduced at a speed reduction ratio k by the pinion 12 and the internal gear 22.

As rotation of the motor 72, dependent on the vehicle speed information, is transmitted via the gears 73, 74, 75 to the feed screws 76, the feed screws 76 are rotated to move the nuts 77 vertically to cause the support shaft 61 engaging the nuts 77 to translate the central piece 54 vertically. The first slide piece 52 is slid along the arm 23 in the diametrical direction of the main shaft 21, whereas the second slide piece 53 is vertically slid along the guide 42.

Since the arm 23 is turned in unison with the main shaft 21, the first slide piece 52 fitted over the arm 23 is turned with the main shaft 21, and such turning movement of the first slide piece 52 is converted to lateral movement of the central piece 54. The second slide piece 53 is also moved laterally with the central piece 54, and so is the output member 41 affixed to the guide 42 fitted over the second slide piece 53.

Thus, the steering angle ratio of the rear wheels 97 to the front wheels 7 is adjusted to an optimum value dependent on the vehicle speed.

Assuming that the rotational angle of the input shaft 11 is indicated by $\theta$ and the rotational angle of the arm 23 is indicated by $\phi$, these rotational angles are related to each other as follows:

$$\phi = \theta/k$$

Furthermore, assuming that the amount of displacement of the center of the slide assembly 51, which is shown as a spherical body in FIG. 3, from the axis of the main shaft 21 is given by h, the amount y of lateral movement of the output member 41 is expressed by:

$$y = h \tan \phi = h \tan(\theta/k)$$

If, for example, the maximum value of $\theta$ is 270°, k=6.5, and h is in the range of ±18 mm, then the steering angle of the rear wheels 97 can freely be adjusted in the range of ±16 mm for the amount y of lateral movement of the output member 41.

Since the amount h varies as a function of the vehicle speed in the 4WS system of the present invention, the amount y is given by $y\alpha \tan(\theta/k)$ at a constant vehicle speed, and may be considered to be $y\alpha\theta$ in a range in which $(\theta/k)$ is small. Therefore, the steering angle ratio between the front and rear wheels can be controlled substantially constantly dependent on the vehicle speed. As the rate of a change in the vehicle speed is generally smaller than the steering speed, the amount h is not varied substantially quickly. Thus, the drive force needed to change the amount h may be small. Particularly, inasmuch as the rear wheel steering angle adjustment as described above is effected only through vertical movement of the slide assembly 51 without vertically moving the output member 41, the drive force required for steering angle adjustment may be small. Monitoring of the function is simple since only movement of one of the components of the rear wheel steering mechanism is monitored and compared with the vehicle speed.

Figure 9:
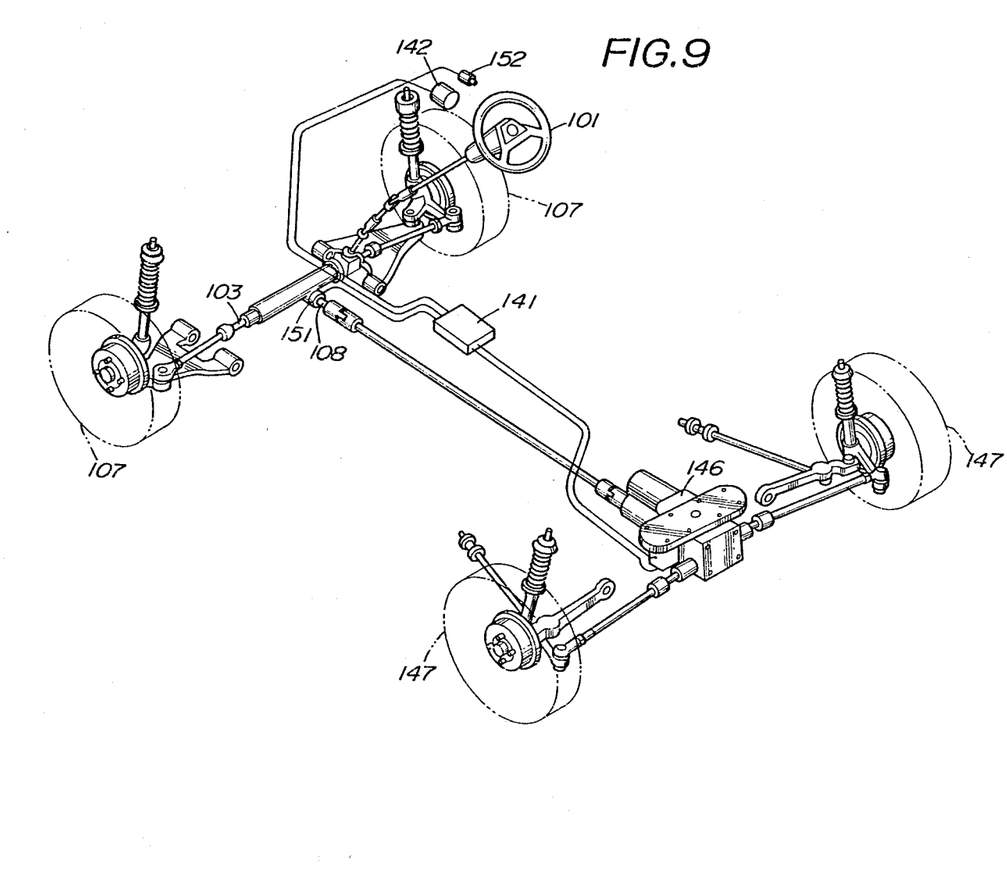
FIG. 9 is a view similar to FIG. 1, illustrating a steering system according to a second embodiment of the present invention.

FIG. 9 shows a steering system according to a second embodiment of the present invention. The 4WS system of this embodiment includes a steering angle sensor 151 and a manual steering direction or phase changeover switch 152. An ECU 141 is supplied with vehicle speed information from a vehicle speed sensor 142, steering angle information from the steering angle sensor 151, and the switching condition (ON or OFF) of the manual phase changeover switch 152 for controlling the steering angle ratio of rear wheels 147 to front wheels 107 according to the following logic:

When the vehicle speed is low enough, the steering angle is close to zero, indicating substantially straight vehicle travel, and the switch 152 is ON, switching is effected from the opposite-phase mode in which the rear wheels are steered in the direction opposite to the steering direction of the front wheels to the in-phase mode in which the rear wheels are steered in the same direction as the steering direction of the front wheels. Under other conditions, no such switching is carried out even if the switch 152 is ON.

Even when the switch 152 is back to the OFF condition, return from the in-phase mode to the opposite-phase mode is carried out only if the vehicle speed is sufficiently low and the steering angle indicates substantially straight vehicle travel, so that the system control goes back to a normal vehicle-speed function program. No such return from the in-phase mode to the opposite-phase mode is effected under other conditions.

Thus, phase switching is effected by a motor only when the vehicle speed is low enough and the steering angle is indicative of substantially straight vehicle travel. The force needed to effect such phase switching may be large enough to overcome the friction in the mechanism.

According to the above control, the vehicle driver is required to return a steering wheel 101 back to the straight travel position when switching from the opposite-phase mode to the in-phase mode, and is also required to return the steering wheel 101 back again to the straight travel position when the in-phase mode is no longer necessary after the mode switching. The procedure to be performed by the driver is considered to be useful since frequent operation of the steering wheel does not impose a physical burden on the driver because the 4WS system is generally combined with a front wheel power steering system and also since the driver should be mentally alerted as the steering response is entirely different before and after the mode switching.

In the preceding embodiment the phase changeover switch 152 is of the ON/OFF type and intended for switching to the maximum steering angle ratio in the in-phase mode. However, the switch 152 may be designed to specify an analog quantity for selecting a steering angle ratio in the in-phase mode. While in the illustrated embodiment the steering angle sensor 151 is combined with an output pinion shaft 108, it may be coupled to the steering shaft, a rack shaft 103, or a component in a rear wheel steering gear box 146 accomodating therein an adjusting mechanism for varying the steering angle of the rear wheels 147 or the motion converting mechanism in the preceding embodiment.

With the arrangement of the second embodiment, as described above, the drive device in the rear wheel steering mechanism is operated by a command from the phase changeover switch only when the vehicle speed is low enough and the steering angle indicates substantially straight vehicle travel. Thus, the in-phase mode at low vehicle speed can be added without requiring an increase in the capacity of the drive device.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A steering system for steering front and rear wheels of an automotive vehicle, comprising:
    a front steering means for steering front wheels;
    a rear steering means for steering rear wheels at a steering angle having a prescribed ratio to a steering angle for the front wheels;
    said rear steering means including an adjustment device for varying the steering angle of the rear wheels and drive means for driving said adjustment device; and
    said drive means including a gear mechanism connected with said adjustment device and a pair of motors coupled to said gear mechanism for driving said gear mechanism, said pair of motors being driven in association with each other.

2. A steering system according to claim 1, wherein:
    each of said motors is capable of driving said gear mechanism independently of the other motor so that the rear steering system will properly function even if one of the motors fails to function.

3. A steering system according to claim 1, further including:
    means for controlling operation of said rear steering means; and
    means for monitoring the operation of said pair of motors, said monitoring means providing an output to said control means.

* * * * *